United States Patent
Dellas

(10) Patent No.: US 12,020,528 B2
(45) Date of Patent: Jun. 25, 2024

(54) HANDHELD MOBILE COMMUNICATION DEVICE CONNECTED DONATION RECEIVING APPARATUS

(71) Applicant: James Dellas, Essendon North (AU)

(72) Inventor: James Dellas, Essendon North (AU)

( * ) Notice: Subject to any disclaimer, the term of this patent is extended or adjusted under 35 U.S.C. 154(b) by 637 days.

(21) Appl. No.: 17/296,046

(22) PCT Filed: Nov. 25, 2019

(86) PCT No.: PCT/AU2019/051290
§ 371 (c)(1),
(2) Date: May 21, 2021

(87) PCT Pub. No.: WO2020/102859
PCT Pub. Date: May 28, 2020

(65) Prior Publication Data
US 2022/0028201 A1 Jan. 27, 2022

(30) Foreign Application Priority Data

Nov. 23, 2018 (AU) .................................. 2018904467
Aug. 16, 2019 (AU) .................................. 2019902972

(51) Int. Cl.
*G07D 5/02* (2006.01)
*G06V 10/56* (2022.01)
(Continued)

(52) U.S. Cl.
CPC .............. *G07D 5/02* (2013.01); *G06V 10/56* (2022.01); *G07D 7/162* (2013.01); *G07D 7/164* (2013.01);
(Continued)

(58) Field of Classification Search
CPC .......... G07D 5/02; G07D 7/162; G07D 7/164; G07D 7/2016; G07D 11/009;
(Continued)

(56) References Cited

U.S. PATENT DOCUMENTS 5,506,393 A 4/1996 Ziarno
5,887,273 A 3/1999 Ziarno
(Continued)

FOREIGN PATENT DOCUMENTS

GB 2345181 A 6/2000
GB 2519284 A 4/2015
(Continued)

OTHER PUBLICATIONS

English Translation of JP 2014167666 A (Year: 2014).*
(Continued)

*Primary Examiner* — Jeffrey A Shapiro
(74) *Attorney, Agent, or Firm* — INNOVATION CAPITAL LAW GROUP, LLP; Vic Lin

(57) ABSTRACT

Donation receiving apparatus has a denomination discriminator interfacing a storage area. The denomination discriminator has at least one sensor for sensing at least one physical characteristic of currency passing therethrough. A device controller interfaces a mobile communication device interface and the denomination discriminator. In use, the device controller establishes communication with the mobile communication device, detects a denomination using the at least one physical characteristic and transmits the denomination to the mobile communication device. The mobile communication device may execute an application controller which displays a graphical user interface on a digital display thereof which may display the denomination.

21 Claims, 6 Drawing Sheets

(51) Int. Cl.
*G07D 7/162* (2016.01)
*G07D 7/164* (2016.01)
*G07D 7/20* (2016.01)
*G07D 11/00* (2019.01)
*G07D 11/125* (2019.01)
*G07D 11/22* (2019.01)
*G07F 1/02* (2006.01)
*G06V 30/10* (2022.01)
*G07D 9/00* (2006.01)
*G07D 11/32* (2019.01)
*H04W 88/02* (2009.01)

(52) U.S. Cl.
CPC ......... *G07D 7/2016* (2013.01); *G07D 11/009* (2013.01); *G07D 11/125* (2019.01); *G07D 11/22* (2019.01); *G07F 1/02* (2013.01); *G06V 30/10* (2022.01); *G07D 9/00* (2013.01); *G07D 11/32* (2019.01); *G07D 2205/00* (2013.01); *G07D 2207/00* (2013.01); *H04W 88/02* (2013.01)

(58) Field of Classification Search
CPC ........ G07D 11/125; G07D 11/22; G07D 9/00; G07D 11/32; G07D 2205/00; G07D 2207/00; G07D 7/12; G07D 11/14; G07D 11/60; G07D 7/16; G06V 10/56; G06V 30/10; H04W 88/02; G06Q 20/10; G06Q 20/102; G06Q 20/085; G06Q 20/32; G06Q 20/3276; G06Q 30/0279; G07F 1/00; G07F 1/02
USPC ........................................................ 194/335
See application file for complete search history.

(56) References Cited

U.S. PATENT DOCUMENTS

| | | | |
|---|---|---|---|
| 6,092,052 A * | 7/2000 | Ziarno | G06Q 20/20 |
| | | | 705/16 |
| 6,889,849 B2 | 5/2005 | Heidel et al. | |
| 6,913,260 B2 | 7/2005 | Maier et al. | |
| 2003/0168308 A1* | 9/2003 | Maier | G07D 7/1205 |
| | | | 194/207 |
| 2010/0331043 A1 | 12/2010 | Chapman et al. | |
| 2013/0273843 A1 | 10/2013 | Shimota et al. | |

FOREIGN PATENT DOCUMENTS

| | | | | |
|---|---|---|---|---|
| JP | H10302110 A | | 11/1998 | |
| JP | 2014167666 A | * | 9/2014 | ............... G07D 5/02 |
| KR | 20160107869 A | | 9/2016 | |

OTHER PUBLICATIONS

International Preliminary Report on Patentability (Chapter II) dated Dec. 14, 2020 from PCT Application No. PCT/AU2019/051290.
International Search Report dated Feb. 11, 2020 from PCT Application No. PCT/AU2019/051290.

* cited by examiner

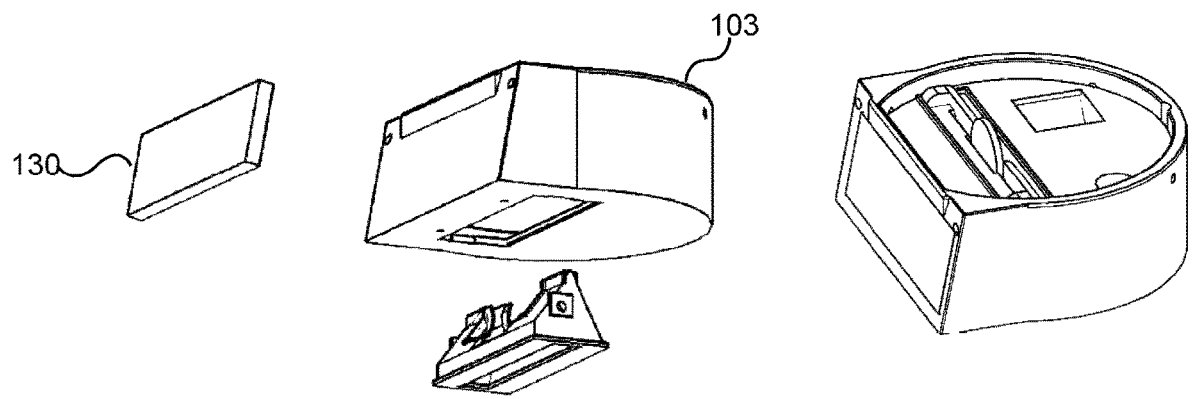
Figure 9A
Figure 9B
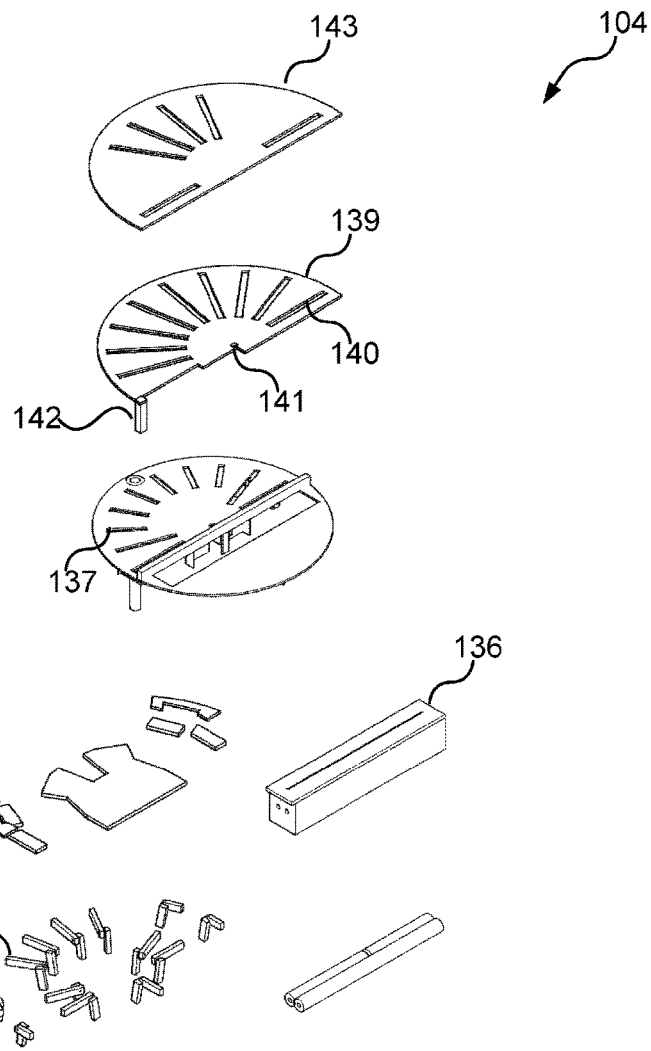
Figure 10

HANDHELD MOBILE COMMUNICATION DEVICE CONNECTED DONATION RECEIVING APPARATUS

FIELD OF THE INVENTION

This invention relates generally to donation receiving apparatus, and, more particularly, to handheld mobile communication device connected donation receiving apparatus.

BACKGROUND OF THE INVENTION

U.S. Pat. No. 5,506,393 A (Ziarno) 9 Apr. 1996 discloses a donation kettle accepting credit card, debit card and cash donations.

The kettle comprises a display, keyboard and surface for collecting donations and the kettle is configured for associating a donation with an account of a contributor.

The present invention seeks to provide improvements to donation receiving devices which will overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE DISCLOSURE

There is provided herein a handheld donation receiving apparatus comprising storage area therein. Coins and notes can be inserted through a denomination discriminator into the storage area which senses at least one physical characteristic thereof.

The apparatus further comprises a mobile communication device interface for communication with a mobile communication device and a device controller interfacing the mobile communication device and the denomination discriminator.

The apparatus may comprise electronically controlled locks which inhibit the use of the apparatus until authenticated with the mobile communication device and the apparatus may comprises a lockable lid which conceals the denomination discriminator thereunderneath.

The apparatus may comprise a cradle holding the mobile communication device which displays a graphical user interface for the operation of the apparatus.

Furthermore, the denomination discriminator may comprise rollers beneath a slotted entrance which accepts both coins and notes. A rotation transducer may detect a length of currency inserted therethrough and a displacement transducer may measure the thickness of the currency.

As such, in use, the user may authenticate with the mobile communication device to unlock the apparatus to receive donations from contributors.

The device controller may be configured with acceptable denomination dimension parameters to categorise denominations and reject currency that does not meet the acceptable denomination dimension parameters.

The apparatus may further utilise image processing for verifying denominations. In one embodiment, a view port for a rearward camera of the mobile communication device is provided for the capturing of image data of currency inserted therethrough. The mobile communication device may comprise an application controller comprising an image processor which recognises at least one of shape, dimension, colour and, in embodiments, recognises alphanumeric values of the currency.

As such, the mobile communication device may be used to verify the currency to cause the device controller to accept or reject a donation.

According to one aspect, there is provided, donation receiving apparatus comprising a storage area therein, a denomination discriminator interfacing the storage area, the denomination discriminator comprising at least one sensor for sensing at least one physical characteristic of currency passing therethrough, a mobile communication device interface for communication with a mobile communication device, and a device controller interfacing the mobile communication device interface and the denomination discriminator wherein, in use, the device controller is configured for establishing communication with the mobile communication device, detecting a denomination using the at least one physical characteristic and transmitting the denomination to the mobile communication device.

The mobile communication device may execute an application controller and wherein the application controller may be configured for displaying a graphical user interface on a digital display thereof and wherein the graphical user interface may be controlled by the application controller to display the denomination.

The denomination discriminator may comprise an entrance slot for taking coins and notes.

The sensors may comprise interrupts sensors along the entrance slot and wherein the controller may be configured for detecting the denomination according to which of the interrupt sensors are interrupted.

The interrupt sensors may comprise a central interrupt sensor and lateral interrupt sensors and wherein the device controller may be configured for detecting the insertion of a coin when the central interrupt sensor is interrupted and the lateral interrupt sensors are not interrupted.

The device controller may be configured for detecting the insertion of a note when the lateral interrupt sensors are interrupted.

The device controller may be configured for detecting whether the lateral interrupt sensors are interrupted substantially simultaneously.

The denomination discriminator may comprise rollers and a rotation transducer operably coupled thereto and wherein the controller may be configured for determining length of the currency inserted through the slot using the rotation transducer and determining the denomination according to the length.

The rotation transducer may comprise an optic sensor detecting markings on a rotating disc coupled to the rollers.

The apparatus may further comprise a displacement transducer operably coupled to the rollers to measure displacement therebetween and wherein the device controller may be configured for determining thickness of the currency inserted through the slot according to the displacement and determining the denomination according to the thickness.

The apparatus may comprise a fixed frame holding a first of the rollers and a displaceable frame holding a second of the rollers and wherein the displacement transducer measure displacement of the displaceable frame.

The displaceable frame may comprise a moving piece interfering with an optic sensor.

The controller may be configured with acceptable denomination dimension parameters and wherein the device controller may be configured for detecting whether at least one of measured thickness and length of the currency meets the acceptable denomination dimension parameters.

The apparatus may further comprise a drive for turning the rollers and wherein the controller may be configured for turning the rollers to reject currency from the slot when detecting that the currency does not meet the acceptable nomination characteristics.

The apparatus may be configured for verifying the denomination by image processing captured currency image data.

The apparatus may comprise a cradle for holding the mobile communication device adjacent a viewport for capturing the currency image data using a rearward image sensor thereof.

The mobile communication device may execute an application controller comprising an image processing controller which processes the currency image data.

The device controller may be configured for transmitting the denomination to the mobile communication device and wherein the mobile communication device may be configured for verifying the denomination using the image processing controller and, if the image processing controller detect that the currency image data does not meet acceptable image characteristics, the application controller may be configured for causing the device controller to reject the currency.

The image processing may be configured for detecting a shape of the denomination.

The image processing may be configured for detecting a dimension of the denomination.

The image processing may be configured for detecting a colour of the denomination.

The image processing controller may be configured for recognising and alpha numeric value of the denomination.

The apparatus may comprise a lid lockable over the denomination discriminator and wherein the controller may be configured for allowing the unlocking of the lid when in communication with the mobile communication device.

The apparatus may comprise a lid lockable over the denomination discriminator and wherein the lid may comprise a cover supported at a distal end of a stem slidably engaged within a body of the apparatus.

The apparatus may comprise a cradle comprising an upper and lower offset-adjustable brackets for retaining corresponding upper and lower edges of the mobile communication device therebetween.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which:

FIG. 9 illustrates an alternative embodiment wherein the apparatus comprises an LCD screen;

FIG. 10 illustrates an alternative embodiment wherein the denomination discriminator separately accepts notes and coins.

DESCRIPTION OF EMBODIMENTS

Figures 1, 2:
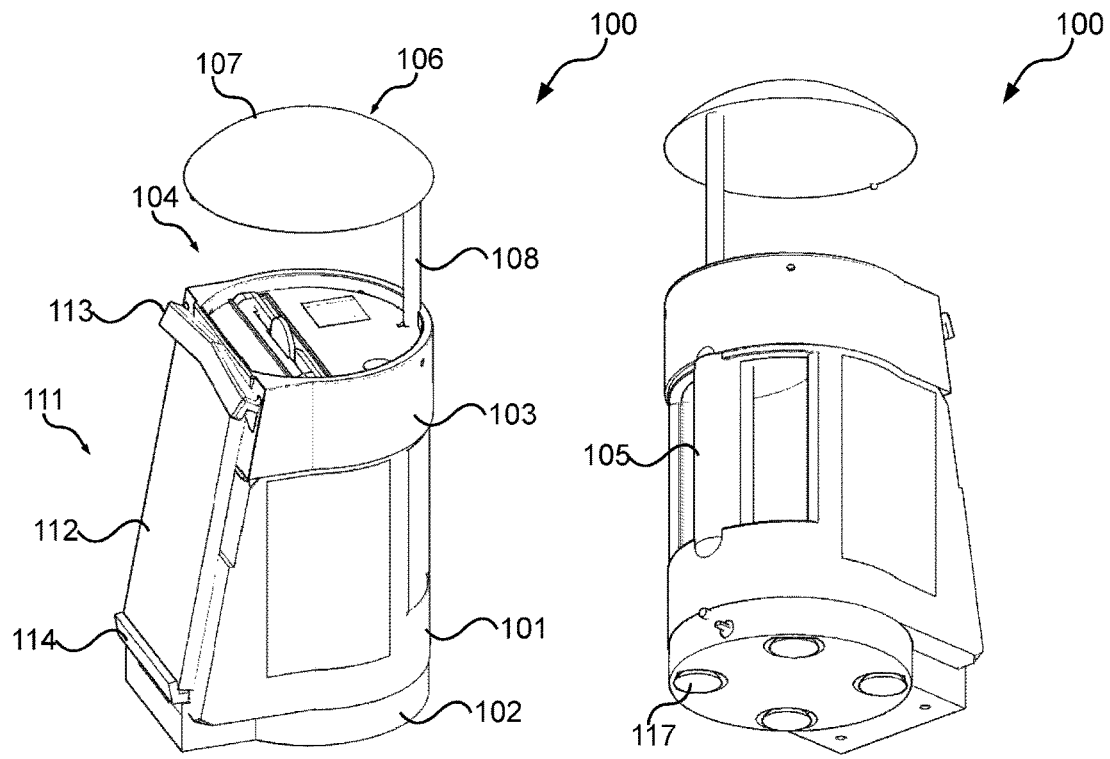
FIG. 1 shows a top perspective view of donation receiving apparatus in accordance with an embodiment.
FIG. 2 shows an underside perspective view of the apparatus.

FIG. 1 shows donation receiving apparatus 100 which may comprise a receptacle 101, base 102 and top part 103.

The receptacle 101 may define a monetary storage area 109 therein and the top part 103 may comprise a denomination discriminator 104 configured for discriminating monetary denominations of currency passing therethrough into the storage area 109.

Figures 3, 4:
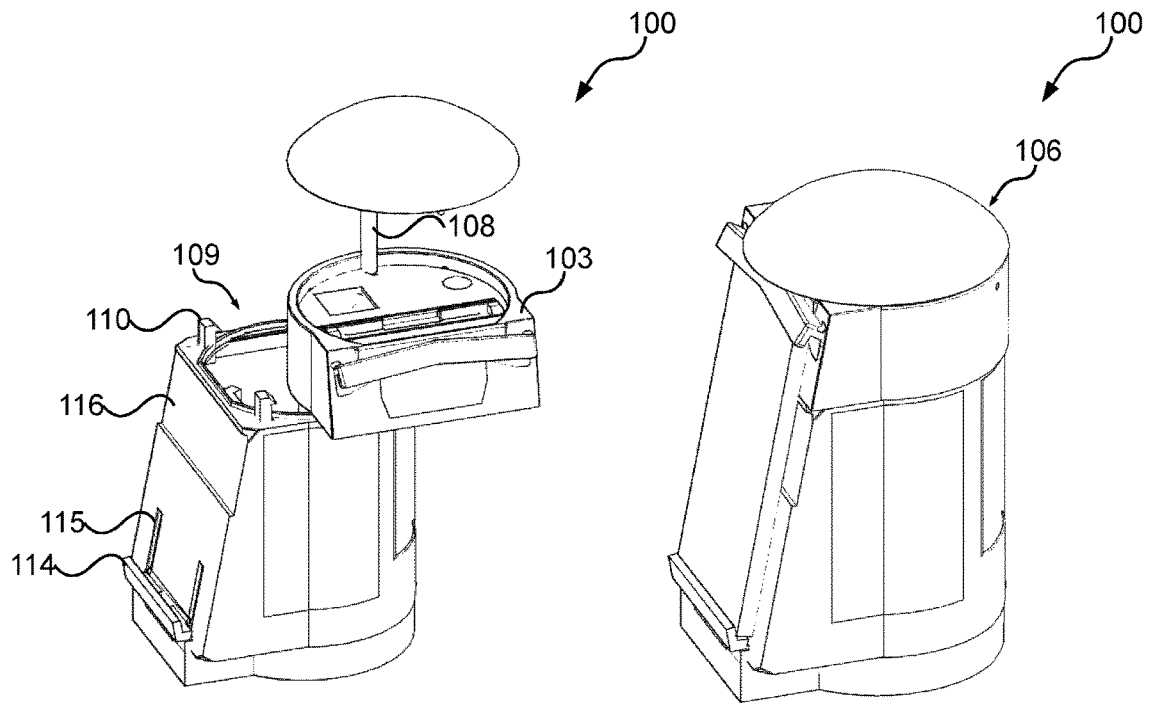
FIG. 3 shows a top perspective view of the apparatus with a top piece thereof open.
FIG. 4 shows a top perspective view of the apparatus with a lid thereof closed.

The apparatus 100 may further comprise a lid 106 for securely covering the denomination discriminator 104 as is shown in FIG. 4. The lid 106 may comprise a cover 107 engaged by a stem 108 slidably retained by the top part 103. The stem 108 may be raised in the manner shown in FIG. 1 to expose the denomination discriminator 104 and lowered in the manner shown in FIG. 4 to securely enclose the denomination discriminator 104. The cover 107 may be substantially dome-shaped and may correspond in cross-section with a rim of the top part 103 to securely enclose the denomination discriminator 104 and prevent tampering therewith.

The top part 103 may define a surface for soft counting and may comprise recesses therein for temporary storage of notes and coins.

As is shown in FIG. 3, the top part 103 may be removable from the receptacle 101 for access to the storage area 109 therein. In the manner shown in FIG. 3, the top part 103 may pivot about the stem 108. Securement latches 110 may lock the top part 103.

The apparatus may comprise a cradle 111 for engaging a mobile communication device 112.

The cradle 111 may comprise a top bracket 113 and a bottom bracket 114 which engage the mobile communication device 112 therebetween. In embodiments, the base 102 may press against a lower edge of the bracket 114, thereby preventing the removal of the mobile communication device 112.

As is shown in FIG. 3, the bottom bracket 114 may slide upwardly along channels 115 to thereby engage mobile communication devices 112 of differing lengths.

The cradle 111 may comprise a credit card recess 116 such that contactless payment cards can slide behind a rear surface of the mobile communication device 112 for contactless payment.

The receptacle 101 may comprise a rearward recess and handle 105 for holding the apparatus 100.

The base 102 may comprise fasteners for fastening the apparatus 100 to a surface. In the embodiment shown in FIG. 2, the undersurface of the base 102 comprises a plurality of sucker feet 117 for suction attachment to a smooth surface. The base 102 may comprise physical mechanical interlocks in alternative embodiments for physically locking the base 102 to the surface. In embodiments, the fasteners may extend right up to the top piece 103, thereby preventing the removal thereof also.

Figure 11:
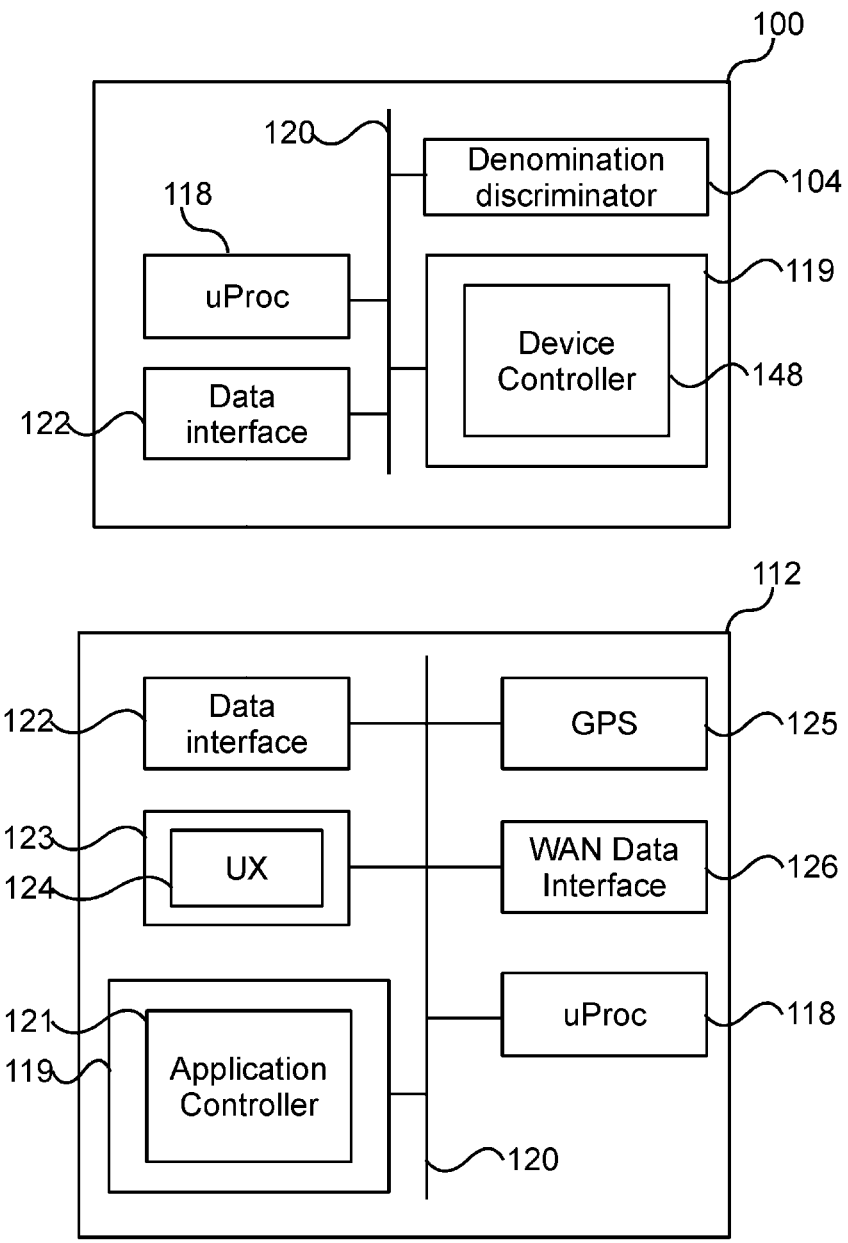
FIG. 11 shows a functional schematic of the controllers of the apparatus and mobile communication device.

FIG. 11 illustrates the apparatus 100 comprising a processor 118 for processing digital data. The processor 118 is in operable communication with a memory device 119 across a system bus 120. The memory device 119 is configured for storing digital data including computer program code instructions. In use, the processor 118 fetches these computer program code instructions and associated data from the memory device 119 for the implementation of the functionality of the apparatus 100.

The memory device 119 may comprise a device controller 148 stored therein.

The processor 118 may further be in operable communication with the denomination discriminator 104 across a system bus 120.

The apparatus 100 may comprise a mobile communication device interface for communication with a mobile communication device 112. In this regard, the apparatus may comprise a data interface 122 for communicating with a corresponding data interface 122 of the mobile communication device 112.

The mobile communication device interface may be a wired or wireless interface. The wide variant thereof may comprise a data port retained within the lower bracket 114 which insert into a corresponding communication port of the mobile communication device 112. Alternatively, the wireless variant may comprise a short-range Bluetooth™ wireless interface such that the mobile communication device 112 may communicate wirelessly with the apparatus 100 when in proximity therewith.

The mobile communication device 112 may similarly comprise a processor 118 in operable communication with a memory device 119 across a system bus 120 and which may similarly comprise an application controller 121 for configuring the functionality of the mobile communication device 112.

The mobile communication device 112 may comprise a digital display 123 which may be controlled by the application controller 121 to implement a user interface 124 thereon.

The mobile communication device 112 may further comprise a GPS receiver 125 for determining the location of the mobile communication device 112 and the apparatus 100. The GPS receiver 125 may be used for restricting the operable location of the apparatus 100.

Furthermore, the mobile communication device 112 may further comprise a wide area network data interface 126 for sending and receiving data across a wide area networks. The data interface 126 may be a Wi-Fi, GSM data interface or the like.

Figure 5:
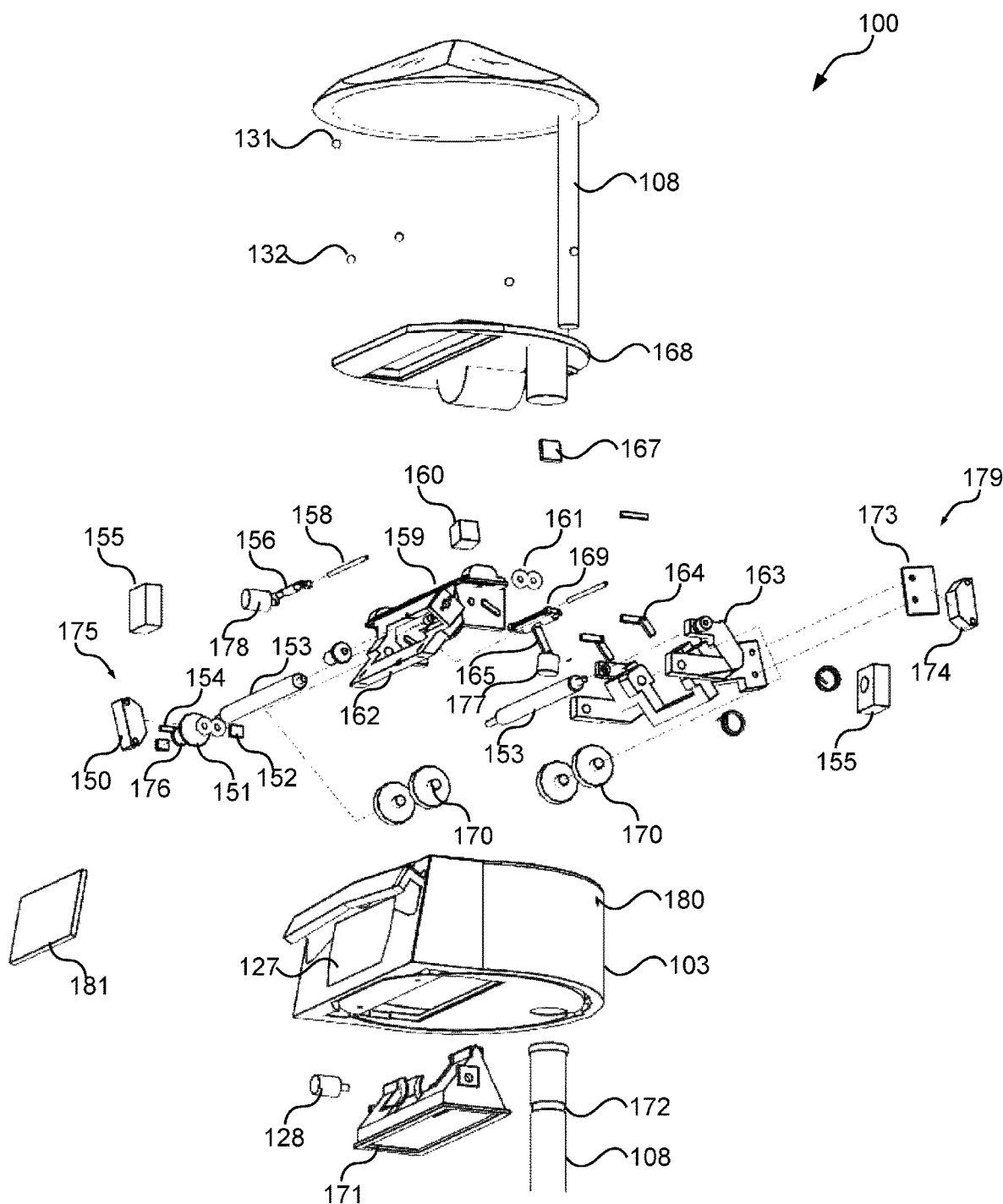
FIG. 5 illustrates an exploded view of a denomination discriminator of the apparatus.

With reference to FIG. 5, the denomination discriminator 104 may comprise a slotted entrance 159 retained within a top plate 168 for receiving notes and coins.

The discriminator 104 may comprise rollers 153 beneath the slotted entrance 159.

One of the rollers 153 may be fixed and the other displaceable.

The fixed roller 153 may be statically retained within a fixed frame 162 and the displaceable roller 153 may be retained within a displaceable frame 163.

The discriminator 104 may comprise a displacement transducer 179 operably coupled to the displaceable frame 163 for measuring thickness of currency inserted through the slotted entrance 159. The displacement transducer 179 may comprise a moving piece 173 interfering with a precision optic sensor 174. In alternative embodiments, the displacement transducer 179 may comprise a magnet moving with respect to a magnetic flux sensor.

The discriminator 104 may further comprise a rotation transducer 175 for counting revolutions of the rollers 153 to determine a length of currency inserted through the slotted entrance 159. The rotation transducer 175 may comprise a magnetic sensor 176 sensing an adjacent magnetic disk 151. Alternatively, the rotation transducer 175 may comprise an optic sensor 150 counting revolutions of an adjacent marked disc 151.

Support rollers 170 may support the rollers 153. Stabiliser rollers 158 may interface above the rollers 153 to stabilise currency entering between the rollers 153. Figure-of-eight drive belts 161 may interface between the rollers 153 such that the rollers 153 turn oppositely.

Inbuilt image sensors 155 may be orientated towards the slotted entrance 159 for capturing image data of currency inserted therethrough.

A tamper sensor 160 and reflector 167 may detect tampering within the top piece 103. Additional tamper sensors may be located within the receptacle 101 or base 102.

The discriminator 104 may comprise interrupts sensors arranged along the slotted entrance 159. These may comprise a central flap 169 extending across the slotted entrance having a displacement arm 165. The interrupts sensors may comprise lateral interrupts sensors 164. The discriminator 104 may be configured for detecting the insertion of a coin if the displacement arm 165 of the central flap 169 is displaced and detecting the insertion of a note if the lateral interrupts sensors 164 are interrupted. In embodiments, the interrupts sensors may comprise light beam interrupts sensors. In embodiments, interruption of an interrupt sensor may cause the opening of the central flap 169.

The discriminator 104 may comprise a rejection solenoid 177 which may push the displacement arm 165 upwardly to open the central flap 124 rejecting a coin from the slotted entrance 159.

In embodiments the discriminator 104 may comprise a secondary central flap 156 which may similarly comprise a secondary rejection solenoid 178 for opening the secondary central flap 156.

The slotted entrance 159 may interface with a flue 171 into the storage area 109.

The apparatus 100 may comprise a translucent window 181 through a view port 127 of the top piece 103 allowing for a rearward image sensor of the mobile communication device 112 to capture image data of currency passing through the discriminator 104.

The stem 108 may be locked in place by a locking solenoid 128 interfering with a peripheral indentation 172 thereof. In the embodiment shown in FIG. 5, the stem 108 comprises an upper piece integrally formed with the cover 107 and a lower shaft which engages the upper piece, thereby allowing the removal of the upper piece and the cover. In this embodiment, the lower shaft comprises the peripheral indentation 172. In alternative embodiments, the locking solenoid 128 may be used to lock the top piece 103 to the receptacle 101.

FIG. 9 shows an embodiment wherein the apparatus 100 comprises an inbuilt controller 130 or an internally housed mobile communication device 112 instead of a cradle 112 for the mobile communication device 112. The inbuilt controller 130 or internally housed mobile communication device 112 may expose a digital or LCD display. In accordance with this embodiment, the inbuilt controller 130 may implement the functionality of the application controller 121 of the mobile communication device 112. Alternatively, in accordance with this embodiment, the apparatus 100 may yet communicate with the internally housed mobile communication device 112.

The cover 105 may be translucent for holding advertising material viewably thereunder. The apparatus 100 may comprise a light sensor 131 which may activate a plurality of LEDs 132 for illuminating the slotted entrance 159. LEDs may illuminate from within the slotted entrance 159. The top piece 103 may comprise a drain aperture 180 therethrough for draining any water collected on the top plate.

Figure 6:
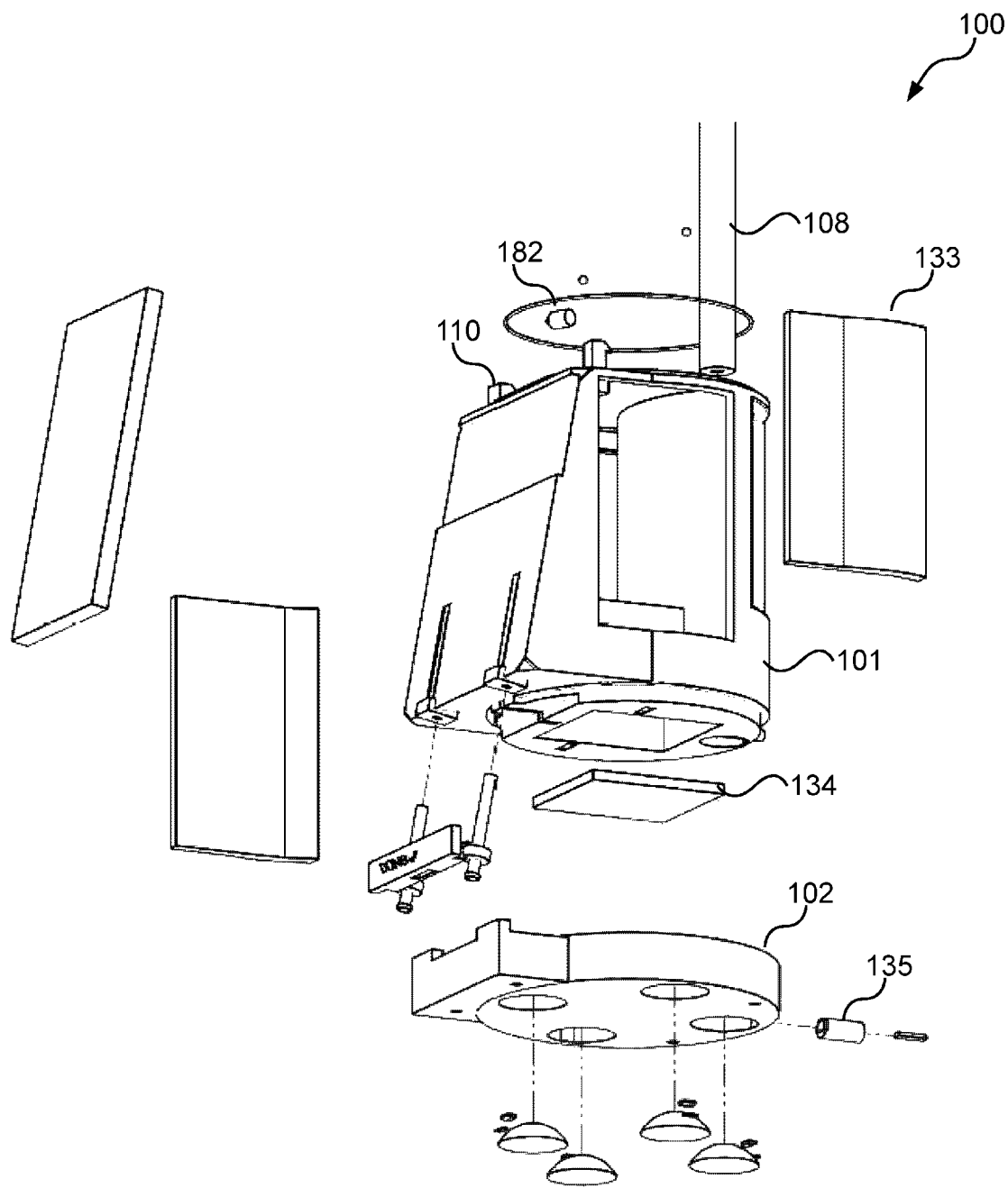
FIG. 6 shows an exploded bottom perspective view of the apparatus.

With reference to FIG. 6, the apparatus 100 may comprise a top piece locking solenoid 182 which may displace a securement latch 110 for opening the top piece 103.

Sides of the receptacle 101 may comprise translucent windows 133 which, in embodiments, may retain advertising material therebehind.

The base 102 may be removable to expose a rechargeable battery 134 or a release mechanism to release the top part 103 from the receptacle 101.

A locking barrel 135 may lock a distal end of the stem 108 in place.

FIG. 10 shows an alternative embodiment wherein the denomination discriminator 104 comprises a separate slotted entrance 136 for taking notes and a plurality of coin slots 137 for taking individual denominations of coins. In accordance with this embodiment, the denomination discriminator 104 may comprise a plurality of interrupts sensors 138 beneath each coin slot 137 to detect passage of individual coins therethrough.

The apparatus 100 in accordance with this embodiment may comprise a security plate 139 comprising a plurality of slots 140 therein which correspond with the coin slots 137 thereunderneath. However, to lock the apparatus, the security plate 139 may be rotated about a pivot point 141 thereof by a stem 142 such that the slot 140 misalign with the coin slots 137 thereunderneath.

A blanking plate 143 restricting the types of coin denominations may be overlaid the coin slots 137.

Figure 7:
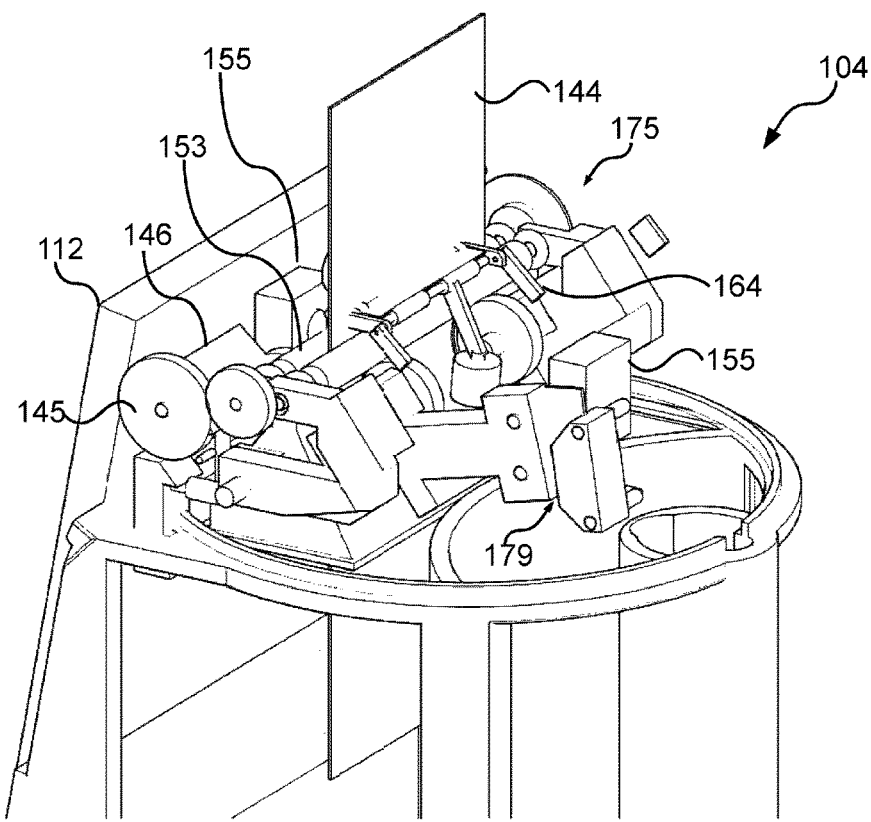
FIG. 7 illustrates the denomination discriminator accepting a note.

FIG. 7 illustrates a note 144 entering the denomination discriminator 104. The width of the note 144 interrupts the lateral interrupts sensors 164. The displacement transducer 179 may measure the thickness of the note 144. The rotation transducer 175 may measure the length of the note 144.

An electric motor 146 may turn cogwheels 145 to drive the rollers 153 when detecting a note 144 or coin 147. The inbuilt image sensors 155 or the rearward image sensor of the mobile communication device 112 may capture image data from the note 144.

Figure 8:
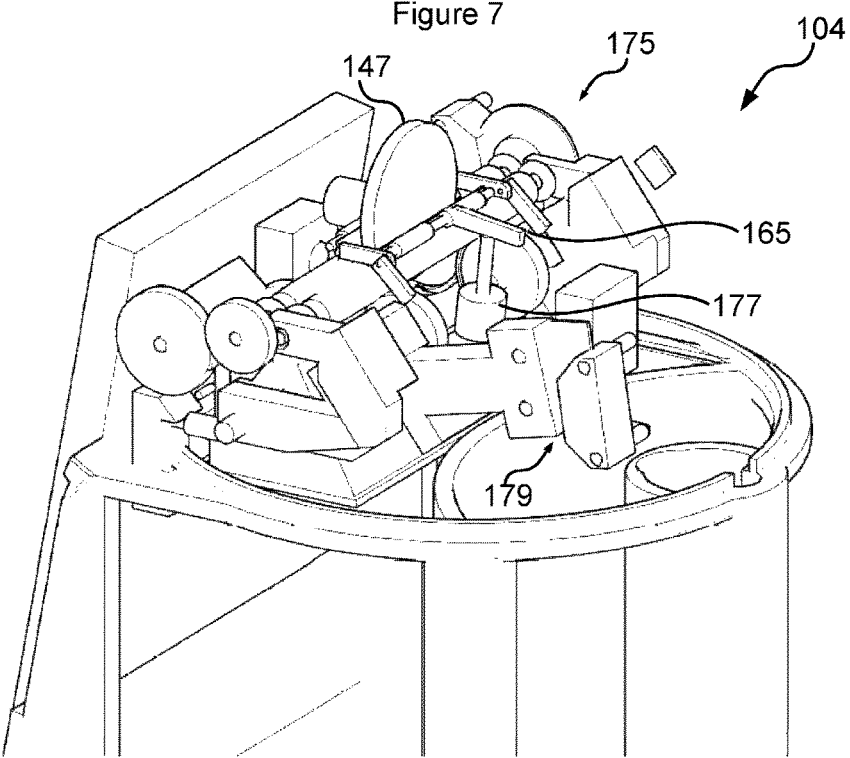
FIG. 8 illustrates the denomination discriminator rejecting a coin.

FIG. 8 illustrates a coin 147 entering the discriminator 104. The coin 147 may displace the central flap 169 and the displacement arm 165. The coin 147 may be insufficiently wide to interrupt the lateral interrupts sensors 164. The displacement transducer 179 may measure the thickness of the coin 147 and the rotation transducer 175 may measure the length of the coin 147.

As is further shown in FIG. 8, the rejection solenoid 177 may displace the displacement arm 165 upwardly to open the central flap 169. The secondary rejection solenoid 178 may also open the secondary central flap 156. The rejection solenoids 177, 178 may be activated when rejecting both coins 147 and notes 144.

Exemplary utilisation of the apparatus 100 will now be described with reference to an exemplary embodiment.

The mobile communication device 112 may be configured with the application controller 121 and the user may authenticate therewith using user account.

Once authenticated, the stem locking solenoid 128 may be disengaged to allow the lifting of the cover 107 to expose the denomination discriminator 104.

A contributor may use the user interface 124 to input contact details, such as email or telephone contact details.

The contributor may insert a coin 147 into the discriminator 104.

The device controller 148 may detect the displacement of the displacement arm 165 but not interruption of the lateral interrupts sensors 164, thereby detecting the insertion of a coin as opposed to note.

Furthermore, the device controller 148 may detect displacement of the displaceable frame 163, being further confirmation of the insertion of a coin.

The controller 148 may activate the motor 146 to turn the rollers 153 to draw in the coin 144. The controller 148 may turn the rollers 153 depending on the at least one interrupt sensor.

The controller 148 may use the rotation transducer 175 to determine a length of the coin 147 and the displacement transducer 179 to measure the thickness of the coin 147.

The memory device 119 of the apparatus 100 may be configured with acceptable coin dimension parameters which may comprise at least one of length and thickness to determine whether the measured length or thickness meets the acceptable dimension parameters of the coin 147.

If the measurements do not meet the acceptable coin dimension parameters, the controller 148 may reverse the drive motor 146 to reverse the rollers 153 to reject the coin 147.

An acceptance LED 154 may illuminate depending on whether an item of currency is accepted or rejected, such as green or red respectively. Alternatively, if the measurements meet the acceptable dimension parameters, the device controller 148 may continue operation of the rollers 146 to draw the coin 147 into the storage area 109.

The controller 148 may use the measurements to categorise the denomination of the coin 147.

The controller 148 may store the detected denomination within memory 119 and may transmit the denomination to the mobile communication device 112 across the mobile communication interface. The mobile communication device 112 may transmit the denomination to a server across a wide area network using the data interface 126.

The denomination may be recorded against a contributor profile and receipt data may be sent to the contributor using the contact information provided by the contributor via the user interface 124.

The apparatus 100 may use the inbuilt image sensors 155 or the rearward image sensor of the mobile communication device to capture image data of the coin 147.

The application controller 121 may comprise an image processing controller to identify visual characteristics of the coin 147.

The image processing controller may be configured for detecting at least one of the shape, dimension and/or colour of the denomination. In embodiments, the image processing controller comprises an image recognition controller configured for recognising an alphanumeric value of the denomination.

As such, the application controller 121 may verify the classification of the denomination. Specifically, the device controller 148 may transmit a detected denomination to the application controller 121 which then verifies the detected denomination in accordance with at least one of the shape, dimension colour and value thereon using image processing.

Should the at least one of the shape, dimension, colour or value deviate from the acceptable parameters, the application controller 121 may cause the device controller 148 to reject the coin 147 by reversing the drive of the rollers 153.

The application controller 121 may further store image data in relation to each donation for subsequent verification.

The contributor may donate a note 144 which, when inserted through the discriminator 104 does not deflect the central flap 169 (or does not deflect the central flap 169 substantially) but does interrupt the lateral interrupts sensors 164, thereby indicating to the device controller 148 the insertion of a note. In embodiments, the controller 148 is configured to detect that the lateral interrupt sensors 164 are triggered substantially simultaneously.

Similarly, the device controller 148 may use the deflection transducer 179 and rotation transducer 175 to measure the thickness and length of the note 144 and reject the note 144 if the length or thickness does not match the acceptable note parameters.

If accepting the note, the device controller 148 may pass the detected denomination of the note 144 to the application controller 121 which may utilise image data obtained from the image sensors 155 or of the mobile communication device 112 to verify the note denomination in accordance with at least one of shape, dimension, colour and/or alphanumeric characters thereon.

In embodiments, the application controller 121 is configured for reading a serial number of the note 144. In further embodiments, the application controller 121 or remote server is configured for verifying the serial number 144 to detect counterfeit notes.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following claims and their equivalents define the scope of the invention.

The term "approximately" or similar as used herein should be construed as being within 10% of the value stated unless otherwise indicated.

The invention claimed is:

1. A donation receiving apparatus comprising a storage area therein, a denomination discriminator interfacing the storage area, the denomination discriminator comprising at least one sensor for sensing at least one physical characteristic of currency passing therethrough, a mobile communication device interface for communication with a mobile communication device, and a device controller interfacing the mobile communication device interface and the denomination discriminator wherein, in use, the device controller is configured for establishing communication with the mobile communication device, detecting a denomination using the at feast one physical characteristic and transmitting the denomination to the mobile communication device, wherein:
the denomination discriminator comprises:
an entrance slot for taking both coins and notes;
a pair of parallel rollers aligned with the slot to take both the coins and notes therebetween;
a rotation transducer operably coupled to the rollers; and
a displacement transducer operably coupled to the rollers to measure displacement therebetween;
wherein, using the same pair of rollers, the controller is configured for determining both length of the currency inserted through the slot using the rotation transducer and thickness of the currency inserted through the slot using the displacement transducer and determining the denomination according to the length and thickness; and
the apparatus is configured for verifying the denomination by image processing captured currency image data and, if the apparatus detects that the currency image data does not meet acceptable image characteristics of the denomination, the apparatus is configured for causing the device controller to reject the currency by turning the rollers.

2. The apparatus as claimed in claim 1, wherein the mobile communication device executes an application controller and wherein the application controller is configured for displaying a graphical user interface on a digital display thereof and wherein the graphical user interface is controlled by the application controller to display the denomination.

3. The apparatus as claimed in claim 1, wherein the sensors comprise interrupt sensors along the entrance slot and wherein the controller is configured for detecting the denomination according to which of the interrupt sensors are interrupted.

4. The apparatus as claimed in claim 3, wherein the interrupt sensors comprise a central interrupt sensor and lateral interrupt sensors and wherein the device controller is configured for detecting the insertion of a coin when the central interrupt sensor is interrupted and the lateral interrupt sensors are not interrupted.

5. The apparatus as claimed in claim 4, wherein the device controller is configured for detecting the insertion of a note when the lateral interrupt sensors are interrupted.

6. The apparatus as claimed in claim 5, wherein the device controller is configured for detecting whether the lateral interrupt sensors are interrupted substantially simultaneously.

7. The apparatus as claimed in claim 1, wherein the rotation transducer comprises an optic sensor detecting markings on a rotating disc coupled to the rollers.

8. The apparatus as claimed in claim 1, wherein the apparatus comprises a fixed frame holding a first of the rollers and a displaceable frame holding a second of the rollers and wherein the displacement transducer measure displacement of the displaceable frame.

9. The apparatus as claimed in claim 8, wherein the displaceable frame comprises a moving piece interfering with an optic sensor.

10. The apparatus as claimed in claim 1, wherein the controller is configured with acceptable denomination dimension parameters and wherein the device controller is configured for detecting whether at least one of measured thickness and length of the currency meets the acceptable denomination dimension parameters.

11. The apparatus as claimed in claim 10, further comprising a drive for turning the rollers and wherein the controller is configured for turning the rollers to reject currency from the slot when detecting that the currency does not meet the acceptable denomination characteristics.

12. The apparatus as claimed in claim 1, wherein the apparatus comprises a cradle for holding the mobile communication device adjacent a viewport for capturing the currency image data using a rearward image sensor thereof.

13. The apparatus as claimed in claim 12, wherein the mobile communication device executes an application controller comprising an image processing controller which processes the currency image data.

14. The apparatus as claimed in claim 13, wherein the device controller is configured for transmitting the denomination to the mobile communication device and wherein the mobile communication device is configured for verifying the denomination using the image processing controller and, if the image processing controller detects that the currency image data does not meet acceptable image characteristics, the application controller is configured for causing the device controller to reject the currency.

15. The apparatus as claimed in claim 1, wherein the image processing is configured for detecting a shape of the denomination.

16. The apparatus as claimed in claim 1, wherein the image processing is configured for detecting a dimension of the denomination.

17. The apparatus as claimed in claim 1, wherein the image processing is configured for detecting a colour of the denomination.

18. The apparatus as claimed in claim 1, wherein the image processing controller is configured for recognising and alpha numeric value of the denomination.

19. The apparatus as claimed in claim 1, wherein the apparatus comprises a lid lockable over the denomination discriminator and wherein the controller is configured for allowing the unlocking of the lid when in communication with the mobile communication device.

20. The apparatus as claimed in claim 1, wherein the apparatus comprises a lid lockable over the denomination discriminator and wherein the lid comprises a cover supported at a distal end of a stem slidably engaged within a body of the apparatus.

21. The apparatus as claimed in claim 1, wherein the apparatus comprises a cradle comprising an upper and lower offset-adjustable brackets for retaining corresponding upper and lower edges of the mobile communication device therebetween.

* * * * *